United States Patent [19]

Sugahara et al.

[11] 4,126,599

[45] Nov. 21, 1978

[54] WATER-RESISTANT SHAPED STRUCTURE OF GYPSUM AND PROCESS FOR PRODUCTION THEREOF

[75] Inventors: Yujiro Sugahara, Tokyo; Hiroyuki Naito, Tsuruoka; Tokio Okubo, Tsuruoka; Nobuo Omori, Tsuruoka, all of Japan

[73] Assignees: Mizusawa Kagaku Kogyo Kabushiki Kaisha, Osaka; Mitsubishi Corporation, Tokyo, both of Japan

[21] Appl. No.: 770,432

[22] Filed: Feb. 22, 1977

[30] Foreign Application Priority Data

Feb. 26, 1976 [JP] Japan .................................. 51-19463
Jul. 8, 1976 [JP] Japan .................................. 51-80349

[51] Int. Cl.$^2$ ............................................. C08K 3/00
[52] U.S. Cl. .................................. 260/42.13; 106/111
[58] Field of Search ...................... 106/109, 110, 111; 260/42.13

[56] References Cited

U.S. PATENT DOCUMENTS

| | | | |
|---|---|---|---|
| 305,817 | 9/1884 | Hickman et al. | 106/110 |
| 1,211,445 | 1/1917 | Hofman | 106/110 |
| 2,212,811 | 8/1940 | Hann | 106/110 |
| 2,222,781 | 11/1940 | Moore | 106/110 |
| 3,598,621 | 8/1971 | Ferrara | 106/111 |
| 3,770,468 | 11/1973 | Knauf et al. | 106/110 |
| 3,947,398 | 3/1976 | Williams | 260/42.13 |

*Primary Examiner*—L. Dewayne Rutledge
*Assistant Examiner*—John P. Sheehan
*Attorney, Agent, or Firm*—Sherman & Shalloway

[57] ABSTRACT

A water-resistant shaped structure of gypsum comprising (A) calcium sulfate dihydrate formed by hardening of calcium sulfate capable of hydration reaction, (B) a calcium type filler for filling up spaces among crystalline particles of said calcium sulfate dihydrate and (C) a water-insoluble or hardly water-soluble salt of a polybasic acid having a second stage dissociation constant of $10^{-3}$ to $10^{-10}$, especially $10^{-4}$ to $10^{-9}$, as measured at 25° C., said calcium type filler (B) being at least one calcium compound selected from the group consisting of calcium hydroxide, calcium carbonate, calcium silicate, calcium aluminosilicate, and non-water-hardenable anhydrous gypsum and partially hydrated products thereof, wherein the amount of the calcium type filler (B) and the water-insoluble or hardly water-soluble calcium salt (C) is 15 to 75% based on the total amount of the components (A), (B) and (C) as calculated as calcium, the amount of the water-insoluble or hardly water-soluble calcium salt (C) is 0.1 to 30% based on the total amount of the components (A), (B) and (C) as calculated as calcium, the water-insoluble or hardly water-soluble calcium salt (C) is distributed predominantly in the surface portion of the shaped structure, and said surface portion has a pore volume smaller than 0.50 ml/g in pores having a radius in the range of 75 to 75000 Å and a pore volume smaller than 0.20 ml/g in pores having a radius in the range of 4000 to 10000 Å.

16 Claims, 1 Drawing Figure

WATER-RESISTANT SHAPED STRUCTURE OF GYPSUM AND PROCESS FOR PRODUCTION THEREOF

BACKGROUND OF THE INVENTION (1) Field of the Invention

This invention relates to a water-resistant shaped structure of gypsum and a process for the production thereof. More particularly, the invention relates to a shaped structure of gypsum excellent in the water resistance and durability thereof and a process for the production thereof.

Gypsum is known as a cheap construction material produced as a by-product in the exhaust gas desulfurization process, the waste sulfuric acid treatment process, the phosphoric acid production process and like processes. Shaped articles of gypsum, for example, so-called gypsum boards, are ordinarily prepared by kneading gypsum hemihydrate called "calcined gypsum" with water and optionally with reinforcers such as fibers to form a slurry, casting the slurry into a mold having a desirable form, hardening the slurry in the mold and drying the molded structure according to need. These shaped structures of gypsum are excellent in their sound insulating property, heat insulating property and other properties and they can be practically used as construction materials. However, these gypsum structures are defective in that when they fall in contact with water, especially running water, they are gradually dissolved out in water, resulting in extreme reduction of their volume. Therefore, these gypsum structures cannot be applied to uses where there is a fear of their falling into contact with water.

(2) Description of the Prior Art

Attempts have heretofore been made to improve the water resistance in shaped structures of gypsum. For example, Japanese Patent Application Laid-Open Specification No. 85,629/75 discloses a process comprising mixing water-hardenable gypsum with lime, forming a shaped structure of the mixture together with water, and heating and drying the shaped structure in the normal atmosphere or in an atmosphere containing carbon dioxide gas to effect aging and prepare a gypsum-lime hardened shaped structure. This gypsum-lime hardened structure has a lower water absorption than that of an ordinary gypsum hardened structure, and it has a relatively high strength even after it has absorbed water. However, if this gypsum-lime hardened structure is caused to fall in contact with running water, gypsum in the hardened structure is dissolved out into water and the surface portion of the structure is disintegrated or the volume of the structure is reduced (see comparative sample No. 7 shown hereinafter). Further, Japanese Patent Application Laid-Open Specification No. 139,117/75 discloses a process in which a hardened structure of gypsum is dipped in a solution of oxalic acid or sodium oxalate to form a water-resistant coating locally on the gypsum hardened structure. The amount of gypsum dissolved out into water in the so obtained gypsum structure is made much smaller than in a non-treated gypsum hardened structure, but it is impossible to reduce the amount of gypsum dissolved out into water substantially to zero. Further, the hardened structure of gypsum prepared according to the above known process is still insufficient in the point that considerable reduction of the volume is caused by contact with running water (see comparative sample 3).

So far as we know, there has not been developed a shaped structure of gypsum in which reduction of the volume is reduced to substantially zero when it is dipped in running water.

SUMMARY OF THE INVENTION

It is therefore a primary object of this invention to provide a water-resistant shaped structure of gypsum of which the volume is not substantially reduced even when it is dipped in running water for a long time, and a process for the production of such shaped structure of gypsum.

Another object of this invention is to provide a hardened shaped structure of gypsum which has a high resistance to reduction of its water resistance by heat strain, and a process for the production of such shaped structure of gypsum.

Still another object of this invention is to provide a process for preparing a shaped structure of gypsum which excels in water resistance and durability from an industrial waste as the raw material.

In accordance with this invention, there is provided a water-resistant shaped structure of gypsum comprising (A) calcium sulfate dihydrate formed by hardening of calcium sulfate capable of hydration reaction, (B) a calcium type filler for filling up spaces among crystalline particles of said calcium sulfate dihydrate and (C) a water-insoluble or hardly water-soluble salt of a polybasic acid having a second stage dissociation constant of $10^{-3}$ to $10^{-10}$, especially $10^{-4}$ to $10^{-9}$, as measured at 25° C., said calcium type filler (B) being at least one calcium compound selected from the group consisting of calcium hydroxide, calcium carbonate, calcium silicate, calcium aluminosilicate, and non-water-hardenable anhydrous gypsum and partially hydrated products thereof, wherein the amount of the calcium type filler (B) and the water-insoluble or hardly water-soluble calcium salt (C) is 15 to 75% based on the total amount of the components (A), (B) and (C) as calculated as calcium, the amount of the water-insoluble or hardly water-soluble calcium salt (C) is 0.1 to 30% based on the total amount of the components (A), (B) and (C) as calculated as calcium, the water-insoluble or hardly water-soluble calcium salt (C) is distributed predominantly in the surface portion of the shaped structure, and said surface portion has a pore volume smaller than 0.50 ml/g in pores having a radius in the range of 75 to 75000 Å and a pore volume smaller than 0.20 ml/g in pores having a radius in the range of 4000 to 10000 Å.

In the instant specification and claims by the term "the filled Ca amount $(C_1)$" is meant a calcium concentration represented by the following formula:

$$C_1 = \frac{B + C}{A + B + C} \times 100$$

wherein $A$, $B$ and $C$ represent amounts of the above components (A), (B) and (C) as calculated as calcium.

In the instant specification and claims, by the term "the insoluble Ca amount $(C_2)$" is meant a calcium concentration represented by the following formula:

$$C_2 = \frac{C}{A + B + C} \times 100$$

wherein $A$, $B$ and $C$ are as defined above.

In accordance with this invention, there also is provided a process for the production of water-resistant hardened shaped structures of gypsum comprising hardening a shaped structure comprising (A') calcium sulfate capable of hydration reaction, (B') a calcium type filler reactant in an amount of 17 to 300% based on said calcium sulfate (A') as calculated as calcium and (D) water in an amount sufficient to harden said calcium sulfate, optionally in a carbon dioxide gas atmosphere, the calcium type filler reactant (B') being calcium hydroxide, calcium carbonate, calcium silicate, calcium aluminosilicate, non-water-hardenable anhydrous gypsum or a mixture of calcium carbonate, calcium silicate, calcium aluminosilicate or non-water-hardenable anhydrous gypsum with calcium hydroxide, contacting the hardened shaped structure with an aqueous solution of a water-soluble polybasic acid or water-soluble salt thereof having a second stage dissociation constant of $10^{-3}$ to $10^{-10}$ as measured at 25° C. and thereby converting the calcium type filler reactant (B') so that (C) a water-insoluble or hardly water-soluble salt of said polybasic acid is formed in an amount of 0.1 to 30% based on the total components as calculated as calcium.

DETAILED DESCRIPTION OF THE PREFERRED EMBODIMENTS

This invention is in agreement with the prior techniques in the point that hardened shaped structures of gypsum are formed by hydrating and hardening calcium sulfates capable of being hardened by the hydration reaction, such as α-type calcium sulfate hemihydrate, β-type calcium sulfate hemihydrate and water-hardenable anhydrous calcium sulfate. This invention, however, can be clearly distinguished from the known prior techniques in the following points.

As pointed out hereinbefore, known hardened shaped structures of gypsum are extremely poor in the water resistance. It is believed that this poor water resistance in known hardened shaped structures of gypsum is due to not only the fact that calcium sulfate dihydrate formed by the hardening reaction has a considerable water solubility but also to the fact that relatively large spaces are present among crystals of calcium sulfate dihydrate in the hardened product. Therefore, it is considered that this poor water resistance will be improved by forming a coating excelling in water resistance on the surface of a hardened shaped structure of gypsum or on the surfaces of crystals of calcium sulfate dihydrate. However, such attempts have not achieved commercial success. We previously invented a water glass composition particularly excellent in the water resistance (Japanese Patent Application No. 104,893/74), and we proposed a process for improving the poor water resistance of a hardened shaped structure of gypsum by dipping the gypsum structure in this water glass composition to form a coating on the gypsum structure. However, no sufficiently satisfactory result has been attained on an industrial scale according to this proposal. More specifically, heat strain is readily caused between a hardened gypsum structure and a water-resistant coating formed thereon, and if only a part of the water-resistant coating is destroyed by this heat strain, hardened gypsum is immediately dissolved out from this destroyed part and the water resistance of the gypsum shaped structure is instantaneously degraded drastically. This tendency is also observed in case of a hardened gypsum structure having a water-resistant coating formed partially on the structure by reaction with oxalic acid.

One of important features of this invention resides in the novel discovery that when water-hardenable calcium sulfate, especially gypsum hemihydrate, is mixed with a calcium type filler reactant such as calcium hydroxide, calcium carbonate, calcium silicate, calcium aluminosilicate, anhydrous gypsum or a mixture of calcium carbonate, calcium silicate, calcium aluminosilicate or anhydrous gypsum with calcium hydroxide in an amount of 17 to 300%, especially 25 to 150%, based on the water-soluble calcium sulfate as calculated as calcium, the resulting admixture is shaped and hardened optionally in an atmosphere of carbon dioxide gas and the resulting hardened shaped structure is treated with an aqueous solution of a hardening agent of the phosphoric acid or oxalic acid type to convert said calcium type filler reactant so that a water-insoluble or hardly water-soluble calcium salt of the polybasic acid such as phosphoric acid or oxalic acid is formed in an amount of 0.1 to 30%, especially 1 to 25%, based on the total components as calculated as calcium, then spaces among gypsum particles, that is, pore volumes, can be remarkably reduced in the resulting hardened shaped structure of gypsum and there can be obtained a hardened shaped structure of gypsum excellent in the water resistance, in which the water resistance is not degraded by the heat strain and durability of this excellent heat resistance is remarkably enhanced, and in which the volume reduction ratio is substantially zero even when the hardened shaped structure is dipped in running water for a long time.

In this invention, any of the above-mentioned water-hardenable calcium sulfates can be used as the calcium sulfate (A') capable of hydration reaction. In this invention, gypsum formed in the exhaust gas desulfurization process, gypsum formed as a by-product by neutralization of waste sulfuric acid, gypsum formed as a by-product in the phosphoric acid reproduction process, and calcined gypsum, especially gypsum hemihydrate, formed by refining such gypsum product by a known recrystallization method and calcining the refined gypsum can be advantageously used in this invention.

In order to obtain a hardened shaped structure of gypsum having a high water resistance, it is important that the calcium type filler reactant that is used in this invention should be composed of fine particles. In order to reduce spaces among crystals in the resulting hardened shaped structure and further improve the water resistance thereof, it is preferred that the calcium filler reactant be characterized by such a particle size distribution that particles having a particle size larger than 40μ occupy less than 10% of total particles and particles having a particle size smaller than 20μ occupy at least 50% of total particles. In view of the reactivity with the hardening agent, it also is preferred that the specific surface area of the calcium type filler reactant be in the range of 10 to 400 m²/g.

In this invention, calcium hydroxide having a size sufficient to fill up spaces among gypsum crystals, generally a particle size less than 5μ, is preferably used in this invention as calcium hydroxide (B'). Further, unslaked lime may be added to water-hardenable calcium sulfate with water and be digested to calcium dioxide in situ.

Either heavy calcium carbonate or light calcium carbonate can be used in this invention as the component (B'). Of course, a mixture of light calcium carbonate and heavy calcium carbonate can also be used.

Either a so-called ortho salt or a basic salt of calcium silicate can be used as the calcium type reactant (B') in this invention. Further, an acidic salt of calcium silicate, namely calcium silicate rich in silicic acid, can be used. In general, it is preferred to use calcium silicate having a composition represented by the following formula:

$$CaO.nSiO_2$$

wherein $n$ is a number of from 0.1 to 5, especially from 0.2 to 4.

If the molar ratio of the silica component to CaO is higher than 5, the water resistance of the resulting structure sometimes become insufficient. If this molar ratio is lower than 0.1, no particular advantage is attained by the use of calcium silicate.

Calcium silicate that is most preferably used in this invention is one formed by reacting an alkali metal silicate with a water-soluble calcium salt in an aqueous medium to form a calcium salt of silicic acid according to the so-called double composition method and washing, drying, calcining and pulverizing the resulting calcium silicate according to need.

Another preferred type of calcium silicate is synthesized by the so called hydrothermal reaction method. According to this synthesis method, a silicic acid starting material such as finely divided silicic acid and an oxide or hydroxide of calcium are charged in a pressure vessel such as an autoclave together with an aqueous medium, and calcium silicate is synthesized by the actions of pressure, heat and water, namely at a temperature of 100° to 200° C. and under a pressure of 2 to 20 atmospheres (gauge).

Another type of calcium silicate that is used in this invention is one formed by kneading a starting silicic acid material such as finely divided amorphous or crystalline silicic anhydride with an oxide, hydroxide or carbonate of calcium, preferably in the presence of water, drying or calcining the resulting mixture at 60° to 1000° C., especially at 120° to 800° C., according to need, and pulverizing the mixture by the dry or wet pulverization method according to need.

Still another preferred type of calcium silicate that is used in this invention is one formed by using as the starting silicic acid material a member selected from silica-rich natural mineral substances and clays, refined products thereof and products obtained by positively treating such mineral substances and clays with an acid or alkali, adding an oxide, hydroxide or carbonate of calcium to such starting silicic acid material so that an optimum mixing ratio of the two components is attained, reacting the mixture according to a known dry or wet pulverizing mixing method, if necessary under heating, then calcining the resulting reaction product at 60° to 1000° C. according to need, and pulverizing and classifying the resulting product.

In this invention, a composition of the silica component and calcium component in which both the components are not bonded so strongly as to form a salt but which are bonded together to such an extend that conspicuous reduction of the pH is caused (this composition will hereinafter be referred to as "composite") can similarly be used as the calcium silicate.

Any of synthetic and natural calcium aluminosilicates and calcium aluminosilicates formed as by-products in various processes can be used as the calcium type filler reactant (B') in this invention. In general, however, it is preferred to use calcium aluminosilicate having a composition represented by the following formula:

$$CaO.kSiO_2.mAl_2O_3$$

wherein $k$ is a number of from 0.05 to 5, especially from 0.1 to 3, and $m$ is a number of from 0.05 to 5, especially from 0.1 to 3.

Calcium aluminosilicate that is most preferably used in this invention is one formed by mixing an alkali metal silicate such as sodium silicate or sodium polysilicate with a water-soluble aluminum salt such as sodium aluminate or aluminum chloride and a water-soluble calcium salt such as calcium chloride in an aqueous medium, neutralizing the mixture with an acid or alkali according to need, forming calcium aluminosilicate according to the so-called double decomposition method, and water-washing, drying, calcining and finely pulverizing the resulting calcium aluminosilicate according to need.

Further, calcium aluminosilicate that is preferably used in this invention can easily be synthesized by adding a prescribed amount of a basic hydrosol, hydrogel or xerogel of aluminum hydroxide to the reaction mixture used in the above-mentioned hydrothermal method or calcining method for the synthesis of calcium silicate.

Furthermore, calcium aluminosilicate can be formed by subjecting known natural or synthetic zeolite to ion exchange with calcium. Moreover, a product formed by reacting an aluminosilicate clay mineral with a calcium component and a mica clay such as margarite can be used in this invention.

Another type of calcium aluminosilicate that can be used in this invention includes ceramic products composed mainly of $CaO$, $SiO_2$ and $Al_2O_3$, such as Portland cement, alumina cement and blast furnace cement, by-products formed at production of these ceramic products, and by-products formed in the metal refining processes, such as blast furnace slag.

As the anhydrous gypsum, there is employed anhydrous gypsum having no substantial water hardenability, for example, anhydrous gypsum of the type I or II. Preferably, anhydrous gypsum obtained by calcining gypsum formed as a by-product in the exhaust gas desulfurization process, the waste sulfuric acid treatment or the wet type phosphoric acid production process at a temperature higher than 800° C., especially at a temperature higher than 900° C., is used.

In this invention, the foregoing calcium type filler reactants may be used singly or in the form of a mixture of two or more of them. A calcium type filler reactant that is used most preferably in this invention is calcium hydroxide or a mixture of calcium hydroxide with other calcium type filler reactant as mentioned above.

In order to effectively reduce the pore volume and improve the water resistance in the final hardened shaped structure of gypsum, it is important that the finely divided calcium type filler reactant (B') should be used in an amount of at least 17%, especially at least 25%, based on calcium sulfate (A') capable of hydration reaction as calculated as calcium. If the calcium type filler reactant (B') is used in too large an amount, the product is deviated from the category of a shaped structure of gypsum and reduction of the strength is observed. Accordingly, it is preferred that the calcium type filler reactant be used in an amount not larger than 300%, especially not larger than 150%, based on calcium sulfate (A').

According to this invention, a water-hardening composition is formed by incorporating water (D) in the above-mentioned water-hardenable calcium sulfate (A') and finely divided filler reactant (B'), the amount of water being sufficient to harden the calcium sulfate (A'). The amount of water (D) incorporated is changed depending on the kinds of the components (A') and (B') and the mixing ratio thereof, but in general, good results are obtained when water is incorporated in an amount of 0.3 to 1.5 parts by weight, especially 0.4 to 1.2 parts by weight, per part by weight of the sum of the components (A') and (B'). If the amount of water is too small, it is difficult to perform the water-hardening reaction sufficiently, and if the amount of water is too large, the pore volume tends to increase in the resulting hardened shaped structure of gypsum. A suitable amount of water for the particular combination of the water-hardenable calcium sulfate (A') and calcium type filler reactant (B') can easily be determined based on experiments in view of the shapeability and operation adaptability of the water-hardening composition.

Known reinforcers and fillers may be incorporated in the above-mentioned water-hardening composition of this invention. As the reinforcer, there can be mentioned, for example, inorganic fiber reinforcers such as glass fibers, rock wool, slag wool and asbestos, organic fiber reinforcers such as cellulose fibers, polyvinyl alcohol fibers, polyester fibers, polyamide fibers and polyolefin fibers, and powdery reinforcers such as glass powder, colloidal silica (white carbon) and carbon black. Fibrous reinforcers may be used in the form of fleece, staple, web, mat, non-woven fabric, woven fabric or the like. Known fillers such as stone, sand, foamed volcanic ashes and foamed pearlite can be used in this invention. Amounts of these reinforcers and fillers are not particularly critical in this invention, but in general, it is preferred that they be used in amounts smaller than 500 parts by weight, especially smaller than 300 parts by weight, per 100 parts by weight of the sum of the water-hardenable calcium sulfate (A') and finely divided calcium type filler reactant (B'). A powdery or granular reinforcer or filler or a reinforcer or filler in the form of short fibers may be mixed with the foregoing components to form a water-hardening composition. When a reinforcer is used in the form of a web, mat, non-woven fabric or woven fabric, it is impregnated with the water-hardening composition.

Still further, known additives such as setting retarders, setting accelerators and colorants may be incorporated into the water-hardening compositions at known mixing ratios.

In order to enhance the strength in the final hardened shaped structure of gypsum, a water-soluble ethylenically unsaturated monomer and a polymerization initiator may be added to the water-hardening composition of this invention. In this case, polymerization of the monomer is performed in situ simultaneously with hardening of the above composition. When the calcium type filler reactant is incorporated in gypsum, the water resistance of the hardened shaped structure is improved, but with increase of the amount added of the calcium type filler reactor, the mechanical strength, especially the dry mechanical strength, of the hardened shaped structure tends to be lowered. This undesirable tendency can be effectively eliminated by polymerizing a water-soluble ethylenically unsaturated monomer in situ in the hardened shaped structure. Any ethylenically unsaturated monomers which are water-soluble and capable of radical polymerization can be used for this purpose. As suitable examples of such monomers, there can be mentioned, ethylenenically unsaturated carboxylic acids, especially acrylic acid, methacrylic acid, crotonic acid, itaconic acid, fumaric acid and maleic acid, and amides of these acids, especially acrylamide, methacrylamide and aminoalkyl and hydroxyalkyl esters of acrylic acid and methacrylic acid. In addition, such monomers as vinyl pyrrolidone, vinyl trimethyl ammonium chloride and the like may be used. Use of acrylamide is most preferred for attaining the objects of this invention. These monomers may be used singly or in the form of a mixture of two or more of them.

It is preferred that the above-mentioned monomer be used in an amount of 0.05 to 15% by weight, especially 0.1 to 10% by weight, based on the water-hardenable calcium sulfate (A') as calculated as the dihydrate. When the amount of the monomer is smaller than 0.05 by weight, no satisfactory improvement of the strength is attained, and if the amount of the monomer is larger than 15% by weight, no particular increase of the strength can be expected.

Any water-soluble polymerization initiator can be used in this invention. For example, there can be used water-soluble peroxides such as hydrogen peroxide, ammonium persulfate and potassium persulfate, mixtures of these peroxides with known promoters such as amines, and known redox catalysts, that is, mixtures of these peroxides with reducing agents such as sulfites, iron (II) salts and hydrazine. These initiators may be used in so-called catalytic amounts, especially 0.05 to 5% by weight based on the monomer to be polymerized.

The above-mentioned water-hardening composition is shaped into a wall material, a tile, a ceiling material, a floor material, a sheet, a block, a brick, a paving stone or the like. The shaping operation may be performed simultaneously with hardening by hydration of calcium sulfate or hardening may be performed after the shaping operation. Hardening is ordinarily accomplished in 5 minutes to 2 hours if conducted at room temperature. The hardened shaped structure may be aged and dried by standing in open air or heating it at a temperature of 30° to 90° C. if desired. The monomer optionally incorporated in the water-hardening composition is polymerized simultaneously with hardening of calcium sulfate.

In this invention, there may be adopted an embodiment in which a shaped article is maintained in a carbon dioxide gas atmosphere before or after hardening so as to convert at least a part of the powdery calcium type filler reactant (B') to calcium carbonate. This conversion of the reactant (B') to calcium carbonate can be effectively promoted when the shaped structure is wetted with water or steam is made present in the carbon dioxide gas atmosphere.

According to this invention, the resulting hardened shaped structure is contacted with an aqueous solution of a water-soluble polybasic acid or its water-soluble salt having a second stage dissociation constant of $10^{-3}$ to $10^{-10}$, especially $10^{-4}$ to $10^{-9}$, as measured at 25° C., for example, a water-soluble phosphoric acid salt, a water-soluble oxalic acid salt, oxalic acid or hexafluorosilicic acid, whereby the finely divided calcium type filler reactant (B') is converted so that a water-insoluble or hardly water-soluble calcium salt is formed in an amount of 0.1 to 30%, especially 3 to 20%, based on the total components as calculated as calcium.

As the water-soluble phosphoric acid salt, there is preferably employed a phosphoric acid salt represented by the following formula:

$$M^1(M^2)_2PO_4$$

wherein $M^1$ stands for an ammonium group or an alkali metal (sodium, potassium or the like) and $M^2$ stands for hydrogen or the group $M^1$.

As the water-soluble oxalic acid salt, there are preferably employed, for example, sodium oxalate, potassium oxalate and ammonium oxalate.

It is preferred that such hardening agent, especially that of the phosphoric or oxalic acid type, be used in the form of an aqueous solution having a concentration lower than the saturation concentration, especially 0.1 to 30%. Contact of the hardened shaped structure of gypsum with an aqueous solution of the hardening agent can easily be accomplished by dipping the hardened shaped structure in the solution, or coating the solution on the hardened shaped structure by spraying or other suitable means. If the impregnation treatment is carried out in vacuo or under reduced pressure, the amount impregnated of the hardening agent can be remarkably increased. The contact temperature is not particularly critical and in general, good results are obtained when the contact treatment is carried out at room temperature. In view of the water resistance and other physical properties of the final hardened shaped structure, it is not always preferred to perform post hardening (reaction between the hardening agent and calcium hydroxide) under heating.

In order to form on the surface of the hardened shaped structure of gypsum a compact water-resistant surface layer having a high resistance to peeling, it is important that the hardened shaped structure of gypsum should be contacted with an aqueous solution of the hardening agent at a relatively low temperature, for example, at a temperature not higher than 20° C.

One prominent characteristic feature of the hardened shaped structure of gypsum according to this invention is that the pore volume is smaller than 0.50 ml/g in pores having a radius in the range of 75 to 75000 Å and the pore volume is smaller than 0.20 ml/g in pores having a radius in the range of 4000 to 10000 Å. As pointed out hereinbefore, the pore volume of a hardened shaped structure of gypsum, especially the pore volume ($PV_1$) in pores having a radius in the range of 75 to 75000 Å, is changed broadly depending on the amount of water added at the shaping and hardening steps, but in the hardened shaped structure of gypsum according to this invention, the pore volume ($PV_2$) in pores having a radius in the range of 4000 to 10000 Å is limited to a level smaller than 0.2 ml/g.

Another characteristic feature of the product of this invention is that the mode radius of pores is not larger than 0.5μ, which corresponds to less than about one-half of the values in conventional hardened shaped structures of gypsum.

In this invention, if the filled Ca amount ($C_1$) is smaller than values in the above-mentioned range, it is difficult to control the pore volume $PV_2$ in the surface portion of the hardened shaped structure below 0.20 ml/g and hence, it is difficult to reduce the volume reaction ratio to substantially zero when the structure is contacted with running water. If the filled Ca amount ($C_1$) is larger than values in the above-mentioned range, the mechanical strength, especially the strength under contact with water, becomes insufficient.

In this invention, if the insoluble Ca amount ($C_2$) is smaller than values in the above-mentioned range, reduction of the pore volume $PV_2$ and the radius of pores in the largest distribution function range is insufficient and the water resistance of the final hardened shaped structure is insufficient. On the other hand, if the insoluble Ca amount ($C_2$) is larger than values in the above-mentioned range, the water resistance is often degraded by heat strain.

Figure 1:
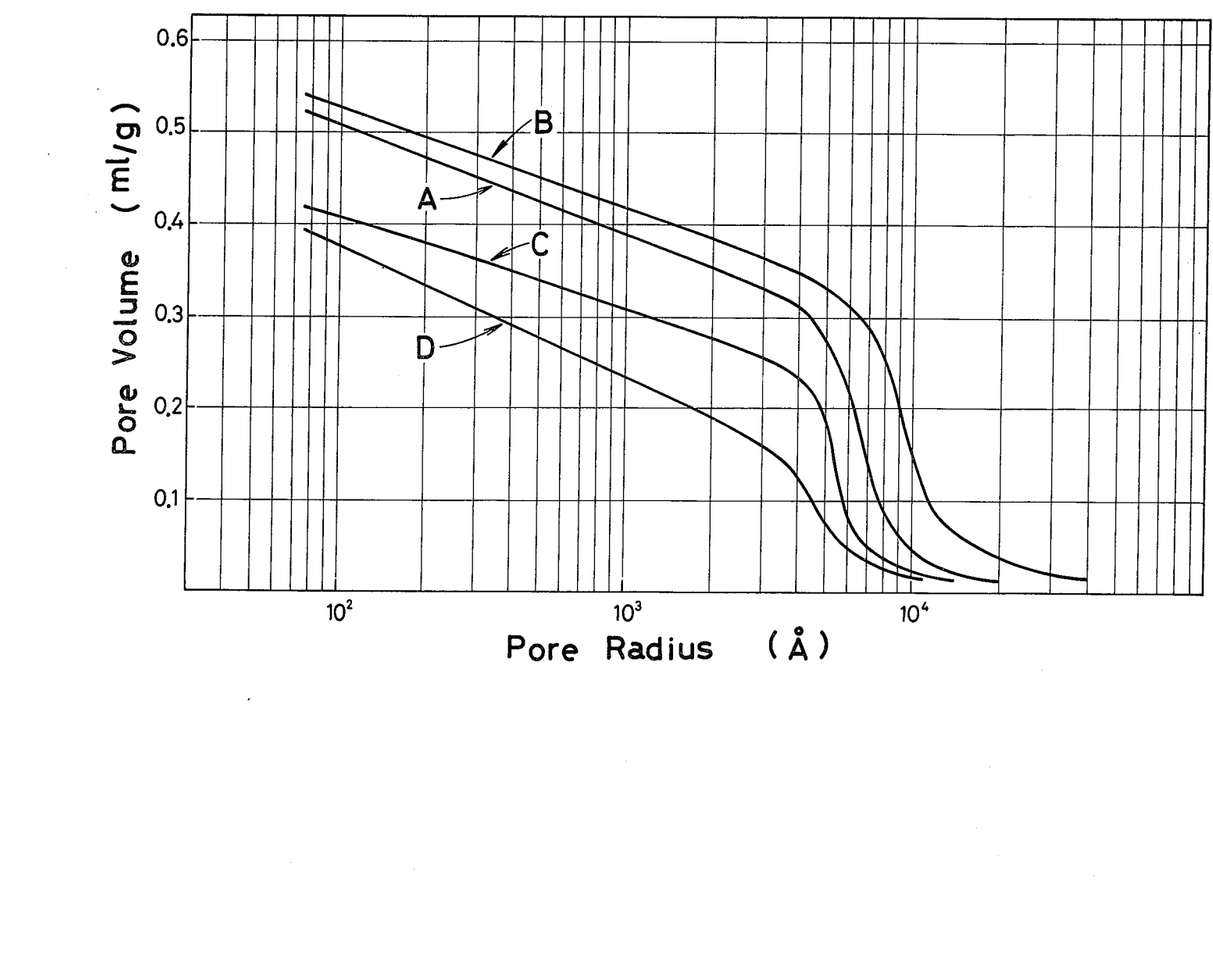
FIG. 1 a graph showing pore volume distributions in surface portions of various hardened shaped structures of gypsum.

FIG. 1 shows pore volume distribution curves obtained by measuring pore volumes in the surface portions of various hardened shaped structures of gypsum by a mercury porosimeter. In FIG. 1, curve A is a pore volume distribution curve of a hardened shaped structure composed solely of gypsum (comparative sample 1). It is seen that in this shaped structure, the $PV_1$ value is 0.520 ml/g, the $PV_2$ value is 0.315 ml/g and the mode radius of pores is about 0.75μ. Curve B is a pore volume distribution curve of a product obtaining by treating a hardened shaped structure composed solely of gypsum with an aqueous solution of oxalic acid (comparative sample 3). It is seen that in this shaped structure, the $PV_1$ value is 0.540 ml/g and the $PV_2$ value is 0.350 ml/g, these two values being not substantially different from those of the shaped structure composed solely of gypsum, and that the mode radius of pores is about 1μ and this mode radius is rather increased by the oxalic acid treatment. Curve C is a pore volume distribution curve of a hardened shaped structure of a composition comprising calcined gypsum and calcium hydroxide (filled Ca amount = 32.0%) (comparative sample 5). It is seen that in this shaped structure, the $PV_1$ value is 0.420 ml/g, the $PV_2$ value is 0.250 ml/g and the mode radius of pores is about 0.6μ. Curve D is a pore volume distribution curve of a product obtained by treating a hardened shaped structure formed from a composition comprising calcined gypsum and calcium hydroxide with an aqueous solution of oxalic acid (filled Ca amount = 32.9%, insoluble Ca amount = 2.6%) (sample 1 of Example 1 given hereinafter). It is seen that in this shaped structure, the $PV_1$ value is 0.393 ml/g, the $PV_2$ value of 0.132 ml/g and the mode radius of pores is about 0.5μ.

From the results shown in Curves A and B of FIG. 1, it is seen that when a water-resistant coating of calcium oxalate is formed in the hardened structure of gypsum, the pore volume is not substantially changed as a whole but the mode radius is increased. From these results, therefore, it is estimated that if a water-resistant coating of oxalic acid is formed in a gypsum-lime hardened structure, the mode radius will be increased. Contrary to this expectation, when a gypsum-lime hardened structure is treated with oxalic acid or the like, not only the $PV_1$ and $PV_2$ values but also the mode radius is remarkably reduced. This finding is quite surprising. According to this invention, by this remarkable reduction of the pore volume and the mode radius, it becomes possible to reduce the volume reduction ratio to substantially zero even under contact with running water, which will readily be understood from Examples given hereinafter.

As will be apparent from the foregoing illustration, hardened shaped structures of gypsum excellent in the water resistance and durability thereof can be advantageously provided according to this invention. Hardened shaped structures of gypsum according to this invention can be effectively used as boards, sheets, wall materials, tiles, bricks, ceiling materials, floor materials, blocks, paving stones and other shaped construction materials.

This invention will now be described in detail by reference to the following Examples that by no means limit the scope of the invention.

EXAMPLE 1

Hardened shaped structures of gypsum were prepared from 4 kinds of water-hardenable gypsums shown below. Each of the water-hardenable gypsums was homogeneously mixed with commercially available calcium hydroxide [Ca(OH)$_2$] of the reagent grade and a calcium type filler reactant at a mixing ratio shown in Table 1 to form a paste. The paste was cast in a gourd-shaped mold of an inner capacity of 70 ml for a Michaelis tensile strength tester and into an angular column having a size of 20 mm × 20 mm × 80 mm and was allowed to stand and aged at a temperature of 25° + 5° C. and a relative humidity of about 50% for 5 days to form a gourd-shaped hardened shaped structure (having a surface area of 124.4 cm$^2$) and an angular columnar hardened shaped structure. An aqueous solution of a polybasic acid or its salt having a concentration of 5% by weight and maintained at a temperature of 15° + 5° C. was impregnated under atmospheric or reduced pressure in each shaped structure by the dipping or spray coating method.

As the polybasic acid or its salt, oxalic acid (C$_2$O$_4$H$_2$), hexafluorosilicic acid (H$_2$SiF$_6$.H$_2$O), ammonium dihydrogenphosphate [(NH$_4$)H$_2$PO$_4$] and ammonium oxalate [C$_2$O$_4$(NH$_4$)$_2$] were chosen among commercially available chemicals of the reagent grade.

The impregnated shaped structures were allowed to stand in open air for 7 days to effect drying. Further, shaped structures aged in a carbon dioxide gas atmosphere in the same manner as described hereinafter with respect to comparative sample 7 were similarly treated with oxalic acid. Thus, 19 kinds of water-resistant hardened shaped structures of gypsum indicated in Table 1 were prepared.

The following 4 gypsum hemihydrates were used as the water-hardenable gypsum in this Example.

(A) α-Type gypsum hemihydrate (dental calcined gypsum manufactured by Sanes Sekko K. K.) (hereinafter referred to as "α-HH")

(B) β-Type gypsum hemihydrate (hereinafter referred to as "M-β-HH") prepared by heat-treating gypsum dihydrate (CaSO$_4$.2H$_2$O) manufactured by Mizusawa Kagaku Kogyo K. K. at 190° C. for 3 hours and allowing to stand and aging the heat-treated product in open air for 1 week.

(C) β-Type gypsum hemihydrate (hereinafter referred to as "P-β-HH") prepared by adjusting the pH of gypsum formed as a by-product in the phosphoric acid production process to 7.5 to 8.0 by using lime, dehydrating and drying the gypsum, heat-treating it at 190° C. for 3 hours and allowing to stand and aging the heat-treated product in open air for 1 week.

(D) β-Type gypsum hemihydrate (hereinafter referred to as "S-β-HH") formed by treating gypsum dihydrate (CaSO$_4$.2H$_2$O) formed by desulfurisation of exhaust gas in an exhaust gas desulfurizing apparatus of a thermoelectric power plant, in the same manner as described above with respect to the β-type hemihydrate (B).

Each of the so prepared structures of gypsum was subjected to chemical analysis to determine CaO, SO$_3$, (COOH)$_2$ and H$_2$O, and the filled Ca amount (C$_1$) and the insoluble Ca amount (C$_2$) were calculated from the determined values.

A surface layer having a thickness of about 1 mm was cut off from each shaped structure, and the volume of pores having a radius of 75 to 75000 Å was measured by a mercury porosimeter (Model AG-65 manufactured by Carloerba Co., Italy).

Each of the shaped structures was completely dipped in running water maintained at a temperature of 20° ± 2° C. and having a running speed of 2 to 3 m/min and kept in this state for 3 weeks (21 days). The volumes of the shaped structure before and after this running water dipping test were measured and the volume reduction ratio was calculated according to the following formula:

$$VR\ (\%) = \frac{VBD - VAD}{VBD} \times 100$$

wherein $VR$ stands for the ratio of the volume reduction in running water, $VBD$ stands for the volume of the shaped structure before the running water dipping test, and $VAD$ stands for the volume of the shaped structure after the running water dipping test.

Further, according to the method described in JIS A-6904, with respect to the angular columnar shaped structure having a size of 20 mm × 20 mm × 80 mm, the water absorption in the state dipped in water and the water absorption at a relative humidity of 100% were measured, and the bending strength after absorption of water was measured.

The water absorption in the state dipped in water was measured in the following manner:

The angular columnar test piece was completely dipped in pure water maintained at a temperature of 20° ± 5° C. When 0.5 minute, 1 minute, 3 minutes and 60 minutes had passed from the start of the dipping test, the test piece was taken out from water, and the weight increase was determined and the water absorption in the state dipped in water was calculated according to the following formula:

$$\text{Water absorption (\%)} = \frac{\text{(weight after absorption of water)} - \text{(dry weight before dipping)}}{\text{(dry weight before dipping)}} \times 100$$

The water absorption at a relative humidity of 100% was determined in the following manner:

Water was charged in the bottom portion of a desicator maintained at room temperature (20° ± 5° C.) and the angular columnar test piece was placed in the desiccator and allowed to stand for 9 days. The increase of the weight with the lapse of time was determined and the water absorption at a relative humidity of 100% was calculated according to the above formula for calculation of the water absorption.

The bending strength of the test piece after absorption of water was determined according to the method described in JIS A-6904. More specifically, the test pieces dipped in water for 0.5 minute and 60 minutes and the test pieces allowed to stand still at a relative humidity of 100% for 3 days and 9 days were subjected to the bending test to determine the bending strength (Kg/cm$^2$) of each test piece. With respect to each test piece, the strength retention ratio was calculated according to the following formula:

$$\text{Strength retention ratio (\%)} = \frac{\text{strength after absorption of water}}{\text{strength before absorption of water}} \times 100$$

Results of the foregoing tests are shown in Table 1.

In order to demonstrate the water resistance-imparting effect, comparative samples were prepared and tested. More specifically, seven comparative samples were prepared in the same manner as above except that calcium hydroxide was not added, the polybasic acid treatment was not conducted though calcium hydroxide was added, the polybasic acid treatment was conducted without addition of calcium hydroxide, the pore volume $PV_1$ was reduced below 0.35 ml/g by reducing the amount added of water though calcium hydroxide was added and the polybasic acid treatment was conducted, or that the standing treatment was conducted in a wet carbon dioxide gas atmosphere having a pressure of 1 atmosphere for 6 days instead of the polybasic acid treatment though calcium hydroxide was added. Results of the tests made on these comparative samples are shown in Table 1.

Table 1

| | Samples of This Invention | | | | | | | |
|---|---|---|---|---|---|---|---|---|
| | 1 | 2 | 3 | 4 | 5 | 6 | 7 | 8 |
| Gypsum Hemihydrate | α-HH | α-HH | M-β-HH | M-β-HH | M-β-HH | M-β-HH | M-β-HH | P-β-HH |
| Amounts (g) of Starting Materials | | | | | | | | |
| gypsum hemihydrate | 80 | 75 | 90 | 75 | 75 | 75 | 60 | 90 |
| calcium hydroxide | 20 | 25 | 10 | 25 | 25 | 25 | 40 | 10 |
| water | 75 | 75 | 60 | 55 | 70 | 80 | 80 | 70 |
| Treatment with Polybasic Acid or Its Salt | oxalic acid | oxalic acid | oxalic acid | oxalic acid | oxalic acid | oxalic acid | oxalic acid | oxalic acid |
| Filled Ca Amount ($C_1$)(%) | 32.9 | 39.5 | 20.7 | 40.0 | 39.5 | 39.0 | 56.6 | 21.0 |
| Insoluble Ca Amount ($C_2$)(%) | 2.6 | 2.5 | 2.7 | 2.2 | 2.3 | 2.5 | 2.3 | 2.8 |
| Pore Volume (ml/g) | | | | | | | | |
| 75 A – 75000 A | 0.393 | 0.376 | 0.368 | 0.355 | 0.486 | 0.492 | 0.375 | 0.486 |
| 4000 A – 10000 A | 0.132 | 0.170 | 0.185 | 0.104 | 0.144 | 0.182 | 0.113 | 0.172 |
| Volume Reduction Ratio (%) in Running Water | 0 | 0 | 0 | 0 | 0 | 0 | 0 | 0 |
| Water Absorption (%) | | | | | | | | |
| dipped in water | | | | | | | | |
| 0.5 minute | 4 | 4 | 10 | 8 | 7 | 7 | 6 | 10 |
| 1 minute | 7 | 7 | 17 | 14 | 14 | 14 | 13 | 16 |
| 3 minutes | 16 | 16 | 23 | 22 | 22 | 22 | 19 | 23 |
| 60 minutes | 20 | 21 | 24 | 23 | 23 | 23 | 20 | 24 |

| | Samples of This Invention | | | | | | | |
|---|---|---|---|---|---|---|---|---|
| | 9 | 10 | 11 | 12 | 13 | 14 | 15 | 16 |
| Gypsum Hemihydrate | P-β-HH | S-β-HH | S-β-HH | α-HH | α-HH | M-β-HH | M-β-HH | |
| Amounts (g) of Starting Materials | | | | | | | | |
| gypsum hemihydrate | 75 | 90 | 75 | 75 | 75 | 75 | 80 | 80 |
| calcium hydroxide | 25 | 10 | 25 | 25 | 25 | 25 | 20 | 20 |
| water | 70 | 70 | 70 | 75 | 75 | 75 | 75 | 75 |
| Treatment with Polybasic Acid or Its Salt | oxalic acid | oxalic acid | oxalic acid | * | ** | *** | oxalic acid | oxalic acid |
| Filled Ca Amount ($C_1$)(%) | 39.5 | 21.0 | 39.5 | 39.5 | 39.0 | 39.0 | 33.0 | 33.0 |
| Insoluble Ca Amount ($C_2$)(%) | 2.3 | 2.8 | 2.4 | 3.5 | 10.2 | 15.5 | 20.5 | 25.5 |
| Pore Volume (ml/g) | | | | | | | | |
| 75 A – 75000 A | 0.493 | 0.485 | 0.495 | 0.425 | 0.385 | 0.380 | 0.375 | 0.355 |
| 4000 A – 10000 A | 0.164 | 0.175 | 0.165 | 0.160 | 0.125 | 0.120 | 0.117 | 0.105 |
| Volume Reduction Ratio (%) in Running Water | 0 | 0 | 0 | 0 | 0 | 0 | 0 | 0 |
| Water Absorption (%) | | | | | | | | |
| dipped in water | | | | | | | | |
| 0.5 minute | 9 | 10 | 8 | 9 | 2 | 2 | 1 | 1 |
| 1 minute | 15 | 16 | 14 | 16 | 5 | 4 | 4 | 4 |
| 3 minutes | 23 | 23 | 23 | 22 | 13 | 12 | 12 | 12 |
| 60 minutes | 24 | 24 | 24 | 24 | 17 | 16 | 14 | 14 |

| | Samples of This Invention | | |
|---|---|---|---|
| | 17 | 18 | 19 |
| Amounts (g) of Starting Materials | | | |
| gypsum hemihydrate | 75 | 75 | 80 |
| calcium hydroxide | 25 | 25 | 20 |
| water | 75 | 75 | 75 |
| Treatment with Polybasic Acid or Its Salt | ** | *** | $CO_2$ treatment plus oxalic acid treatment |
| Filled Ca Amount ($C_1$)(%) | 39.0 | 39.0 | 32.5 |
| Insoluble Ca Amount ($C_2$)(%) | 2.5 | 2.8 | 3.5 |
| Pore Volume (ml/g) | | | |
| 75 A – 75000 A | 0.480 | 0.470 | 0.490 |
| 4000 A – 10000 A | 0.175 | 0.165 | 0.130 |
| Volume Reduction Ratio (%) in Running Water | 0 | 0 | 0 |
| Water Absorption (%) | | | |
| dipped in water | | | |
| 0.5 minute | 7 | 7 | 6 |
| 1 minute | 14 | 13 | 8 |
| 3 minutes | 22 | 21 | 17 |
| 60 minutes | 24 | 23 | 21 |

| | Comparative Samples | | | | | | |
|---|---|---|---|---|---|---|---|
| | 1 | 2 | 3 | 4 | 5 | 6 | 7 |
| Gypsum Hemihydrate | α-HH | α-HH | α-HH | α-HH | α-HH | S-β-HH | α-HH |
| Amounts (g) of Starting Materials | | | | | | | |

Table 1-continued

| | | | | | | | | |
|---|---|---|---|---|---|---|---|---|
| gypsum hemihydrate | 100 | 100 | 100 | 80 | 80 | 75 | 80 | |
| calcium hydroxide | 0 | 0 | 0 | 20 | 20 | 25 | 20 | |
| water | 60 | 55 | 60 | 50 | 55 | 70 | 75 | |
| Treatment with Polybasic Acid or Its Salt | not effected | not effected | oxalic acid | oxalic acid | not effected | not effected | carbon dioxide gas treatment | |
| Filled Ca Amount ($C_1$)(%) | 0 | 0 | 2.8 | 33.0 | 32.0 | 39.0 | 32.9 | |
| Insoluble Ca Amount ($C_2$)(%) | — | — | 2.8 | 2.2 | — | — | — | |
| Pore Volume (ml/g) | | | | | | | | |
| 75 A – 75000 A | 0.520 | 0.550 | 0.540 | 0.345 | 0.420 | 0.492 | 0.412 | |
| 4000 A – 1000 A | 0.315 | 0.277 | 0.350 | 0.180 | 0.250 | 0.220 | 0.201 | |
| Volume Reduction Ratio (%) in Running Water | 82 | 85 | 75 | 10 | 70 | 75 | 30 | |
| Water Absorption (%) | | | | | | | | |
| dipped in water | | | | | | | | |
| 0.5 minute | 15 | 16 | 17 | 4 | 16 | 17 | 10 | |
| 1 minute | 21 | 23 | 23 | 7 | 23 | 23 | 16 | |
| 3 minutes | 24 | 26 | 26 | 16 | 26 | 26 | 23 | |
| 60 minutes | 25 | 27 | 27 | 21 | 27 | 27 | 24 | |

| | Samples of This Invention | | | | | | | |
|---|---|---|---|---|---|---|---|---|
| | 1 | 2 | 3 | 4 | 5 | 6 | 7 | 8 |
| Water Absorption (%) | | | | | | | | |
| standing at relative humidity of 100 % | | | | | | | | |
| 1 day | 0.1 | 0.2 | 0.6 | 0.1 | 0.3 | 0.3 | 0.6 | 0.6 |
| 3 days | 0.4 | 0.6 | 1.0 | 0.4 | 0.7 | 0.7 | 1.2 | 1.2 |
| 5 days | 0.7 | 0.8 | 1.3 | 0.7 | 0.9 | 1.0 | 1.5 | 1.7 |
| 9 days | 0.8 | 0.9 | 1.4 | 0.8 | 1.0 | 1.1 | 1.7 | 1.8 |
| Bending Strength ($Kg/cm^2$)**** | | | | | | | | |
| before absorption of water | 53 | 53 | 55 | 53 | 53 | 53 | 52 | 55 |
| dipped in water | | | | | | | | |
| 0.5 minute | 48 (90.6) | 48 (90.6) | 52 (94.5) | 36 (67.9) | 35 (66.0) | 35 (66.0) | 34 (65.4) | 52 (94.5) |
| 60 minutes | 38 (71.7) | 38 (71.7) | 42 (76.4) | 35 (66.0) | 34 (64.2) | 34 (64.2) | 33 (63.5) | 42 (76.4) |
| standing at relative humidity of 100 % | | | | | | | | |
| 3 days | 41 (77.4) | 42 (79.2) | 44 (80.0) | 42 (79.2) | 41 (77.4) | 41 (77.4) | 40 (76.9) | 44 (80.0) |
| 9 days | 39 (73.5) | 40 (75.5) | 42 (76.4) | 41 (77.4) | 40 (75.5) | 40 (75.5) | 39 (75.0) | 42 (76.4) |

| | Samples of This Invention | | | | | | | |
|---|---|---|---|---|---|---|---|---|
| | 9 | 10 | 11 | 12 | 13 | 14 | 15 | 16 |
| Water Absorption (%) | | | | | | | | |
| standing at relative humidity of 100 % | | | | | | | | |
| 1 day | 0.3 | 0.6 | 0.3 | 0.6 | 0.1 | 0.1 | 0.1 | 0.1 |
| 3 days | 0.7 | 1.2 | 0.7 | 0.9 | 0.3 | 0.3 | 0.2 | 0.2 |
| 5 days | 0.9 | 1.7 | 0.9 | 1.2 | 0.5 | 0.5 | 0.4 | 0.4 |
| 9 days | 1.0 | 1.8 | 1.0 | 1.4 | 0.6 | 0.6 | 0.5 | 0.5 |
| Blending Strength ($Kg/cm^2$)**** | | | | | | | | |
| before absorption of water | 53 | 53 | 53 | 53 | 53 | 53 | 54 | 54 |
| dipped in water | | | | | | | | |
| 0.5 minute | 37 (69.8) | 52 (94.5) | 37 (69.8) | 40 (75.5) | 48 (90.6) | 44 (83.0) | 51 (94.4) | 52 (96.3) |
| 60 minutes | 34 (64.2) | 42 (76.4) | 34 (64.2) | 37 (69.8) | 39 (73.6) | 42 (79.2) | 43 (79.6) | 44 (81.5) |
| standing at relative humidity of 100 % | | | | | | | | |
| 3 days | 41 (77.4) | 44 (80.0) | 40 (75.5) | 42 (79.2) | 43 (81.1) | 42 (79.2) | 45 (63.3) | 45 (63.3) |
| 9 days | 40 (75.5) | 42 (76.4) | 40 (75.5) | 41 (77.4) | 41 (77.4) | 40 (75.5) | 43 (79.6) | 43 (79.6) |

| | Samples of This Invention | | | Comparative Samples | | | | |
|---|---|---|---|---|---|---|---|---|
| | 17 | 18 | 19 | 1 | 2 | 3 | 4 | 5 6 7 |
| Water Absorption (%) | | | | | | | | |
| standing at relative humidity of 100 % | | | | | | | | |
| 1 day | 0.3 | 0.2 | 0.1 | | | | | |
| 3 days | 0.7 | 0.6 | 0.5 | | | | | |
| 5 days | 0.9 | 0.9 | 0.7 | | | | | |
| 9 days | 1.0 | 1.0 | 0.8 | | | | | |
| Bending Strength ($Kg/cm^2$)**** | | | | | | | | |
| before absorption of water | 53 | 53 | 53 | | | | | |
| dipped in water | | | | | | | | |
| 0.5 minute | 37 (69.8) | 37 (69.8) | 48 (90.6) | | | | | |
| 60 minutes | 34 (64.2) | 34 (64.2) | 39 (73.6) | | | | | |
| standing at relative humidity of 100 % | | | | | | | | |
| 3 days | 41 (77.4) | 41 (77.4) | 42 (79.2) | | | | | |
| 9 days | 40 (75.5) | 40 (75.5) | 40 (75.5) | | | | | |

Table 1-continued

| Water Absorption (%) | | | | | | | | |
|---|---|---|---|---|---|---|---|---|
| standing at relative humidity of 100 % | | | | | | | | |
| 1 day | 0.2 | 0.8 | 0.8 | 1.2 | 0.1 | 0.3 | 0.6 | 0.6 |
| 3 days | 0.6 | 1.5 | 1.5 | 3.6 | 0.4 | 0.7 | 1.2 | 1.2 |
| 5 days | 0.9 | 2.0 | 2.0 | 6.3 | 0.7 | 0.9 | 1.7 | 1.7 |
| 9 days | 1.0 | 2.3 | 2.3 | 9.5 | 0.8 | 1.0 | 1.8 | 1.8 |
| Bending Strength (Kg/cm$^2$)**** | | | | | | | | |
| before absorption of water | 53 | 75 | 65 | 62 | 53 | 53 | 53 | 53 |
| dipped in water | | | | | | | | |
| 0.5 minute | 37 | 46 | 28 | 23 | 48 | 26 | 27 | 27 |
| | (69.8) | (61.3) | (43.1) | (37.1) | (90.6) | (49.1) | (50.9) | (50.9) |
| 60 minutes | 34 | 42 | 15 | 13 | 38 | 21 | 24 | 24 |
| | (64.2) | (56.0) | (23.1) | (21.0) | (71.7) | (39.6) | (45.3) | (45.3) |
| standing at relative humidity on 100 % | | | | | | | | |
| 3 days | 41 | 49 | 43 | 35 | 42 | 42 | 42 | 42 |
| | (77.4) | (65.3) | (66.2) | (56.5) | (79.2) | (79.2) | (79.2) | (79.2) |
| 9 days | 40 | 45 | 40 | 30 | 40 | 40 | 40 | 40 |
| | (75.5) | (60.0) | (61.5) | (48.4) | (75.5) | (75.5) | (75.5) | (75.5) |

Notes
*hexafluorosilicic acid
**ammonium dihydrogenphosphate
***ammonium oxalate
****Each parenthesized value stands for the strength retention ratio.

In order to demonstrate the specific pore volume distribution in the surface layer portion of the hardened shaped structure of gypsum according to this invention, pore volume distribution curves (pores having a radius of 75 to 75000 Å) of comparative sample 1 (calcium hydroxide was not added) (curve A), comparative sample 3 (the oxalic acid treatment was effected but calcium hydroxide was not added) (curve B), comparative sample 5 (calcium hydroxide was added but the polybasic acid treatment was not effected) (curve C) and sample 1 of this invention (curve D) are shown in FIG. 1.

After the running water test, the surface layer portion of sample 1 of this invention was subjected to the X-ray diffraction pattern analysis. Peaks inherent of $CaSO_4.2H_2O$, $CaSO_4.H_2O$ and $CaC_2O_4.2H_2O$ were observed.

From the foregoing experimental results, the following can be seen.

When calcium hydroxide is first added to gypsum hemihydrate to fill up spaces among gypsum crystals and the gypsum is treated with a polybasic acid such as oxalic acid or its salt to form a water-insoluble calcium salt of the polybasic acid, there can be obtained a hardened shaped structure which does not show substantial reduction of the volume even if it is allowed to stand still in running water for 3 weeks. Further, this hardened shaped structure according to this invention has a much reduced water absorption and a high strength retention ratio after absorption of water. Moreover, this hardened shaped structure is characterized in that in the surface layer portion thereof, the volume of pores having a radius of 75 to 75000 Å is in the range of 0.35 to 0.5 ml/g and the volume of pores having a radius of 4000 to 10000 Å is smaller than 0.20 ml/g, and by this characteristic, the water resistance of the hardened shaped structure is remarkably improved.

When results obtained with respect to samples of this invention are compared with results obtained with respect to comparative samples, excellent effects attained by this invention will be apparent. More specifically, if calcium hydroxide as the calcium type filler reactant is not added, whether the polybasic acid treatment may be conducted or not, the volume of pores having a radius of 75 to 75000 Å is larger than 0.5 ml/g and the volume of pores having a radius of 4000 to 10000 Å is as large as 0.3 ml/g. Further, when calcium hydroxide is added but the polybasic acid treatment is not effected, spaces among gypsum crystals are filled up to some extent but the volume of pores having a radius of 4000 to 10000 Å is still large. Therefore, in each case, the water resistance in running water is extremely low. In contrast, in the hardened shaped structure of gypsum according to this invention, volumes of pores having a radius of 75 to 75000 Å and pores having a radius of 4000 to 10000 Å are controlled between 0.35 and 0.5 ml/g and below 0.2 ml/g, respectively, whereby the water resistance is maintained at a very high level.

EXAMPLE 2

In this Example four kinds of calcium silicates and four kinds of calcium aluminosilicates prepared by the methods described below or formed as by-products in industrial processes were chosen as the calcium type filler reactant.

Calcium Silicates (I) Commercially available sodium silicate (water glass) was chosen as the starting silicic acid component and dipped in sulfuric acid having a concentration of 60% by weight to cause gelation in the highly acidic liquid and the gel was washed with water to remove the sodium component and sulfate radical. The resulting gel was used for the reaction. Separately, refined calcium carbonate was calcined at about 1000° C. and while the temperature was still maintained at a high level, the calcined product was thrown into water to form calcium hydroxide free of calcium carbonate, which was used for the reaction. Both the starting compounds were mixed at such a mixing ratio that the $CaO/SiO_2$ oxide molar ratio was 1/1 or 2/1, and the mixture was wet-pulverized in a pot mill. The pulverized mixture was subjected to the hydrothermal reaction in an autoclave under a pressure of 10 Kg/cm$^2$ for 60 minutes, and the reaction product was dried at 200° C. for 60 minutes and calcined at 400° C. for 60 minutes. The calcined product was pulverized and fine particles having a particle size smaller than 10μ were collected by classification. Thus, two kinds of finely divided calcium silicates [sample CS-1 ($CaO/SiO_2$ molar ratio = 1/1) and sample CS-2 ($CaO/SiO_2$ molar ratio = 2/1)] were prepared.

(II) As the starting silicic acid component was chosen acid-treated acid clay, and as the starting calcium component was used calcium hydroxide prepared in the same manner as described in (I) above. Both the starting components were mixed so that the CaO/SiO$_2$ oxide molar ratio was 2/1, and the mixture was wet-pulverized in a pot mill and thus reacted. The reaction product was dried at 200° C. for 60 minutes and pulverized, and fine particles having a particle size smaller than 10$\mu$ were collected by classification, to obtain finely divided calcium silicate (sample CS-3).

(III) As the starting silicic acid component was chosen a refined clay obtained by refining naturally occurring diatomaceous earth, and calcium hydroxide prepared in the same manner as described in (I) above was used as the starting calcium component. Both the starting components were mixed so that the CaO/SiO$_2$ oxide molar ratio was 2/1, and the mixture was wet-pulverized in a pot mill to effect reaction. The reaction product was calcined at 600° C. for 2 hours, and the calcined product was pulverized and particles having a particle size smaller than 10$\mu$ were collected by classification to obtain finely divided calcium silicate (CS-4).

Calcium Aluminosilicate (I) Commercially available sodium silicate (water glass No. 3) was chosen as the starting silicic acid component, commercially available calcium chloride (CaCl$_2$) of the reagent grade was chosen as the starting calcium component and commercially available aluminum chloride (AlCl$_3$.6H$_2$O) of the reagent grade was chosen as the starting aluminum component. The amounts of these starting components were determined so that the CaO/Al$_2$O$_3$/SiO$_2$ oxide molar ratio was 6/1/2. The determined amounts of calcium chloride and aluminum chloride were dissolved in water so that the concentration of aluminum chloride was 0.2 mole/liter, to form a chloride solution. Then, sodium silicate (Na$_2$O.3SiO$_2$) was diluted with water so that the weight was increased to two times the original weight, and the dilution was gradually dropped into the chloride solution. The resulting liquid mixture was neutralized with an aqueous solution of sodium hydroxide so that the pH was about 8, to thereby form a gel-like precipitate of calcium aluminosilicate. The precipitate was washed with water until no chloride ion was detected in the washing liquor. The so prepared gel of calcium aluminosilicate was dried at 200° C. for 2 hours and pulverized, and particles having a size smaller than 10$\mu$ were collected by classification to obtain finely divided calcium aluminosilicate (sample AC-1).

(II) Commercially available Portland cement (sample AC-2) and alumina cement (sample AC-3) having a composition indicated in Table 2 were used.

Table 2

| Sample No. | Kind | SiO$_2$ | Al$_2$O$_3$ | CaO | Fe$_2$O$_3$ | Others | Ignition Loss |
|---|---|---|---|---|---|---|---|
| AC-2 | Portland cement | 22.0 | 5.8 | 64.0 | 3.3 | 2.7 | 1.2 |
| AC-3 | alumina cement | 6.4 | 51.7 | 39.0 | 1.2 | 0.8 | 1.0 |

(III) Blast furnace slag formed as a by-product in a blast furnace of the iron refining process was used as calcium aluminosilicate industrially formed as a by-product. The chemical composition (% by weight) of this slag was as follows:
CaO: 40.9
Al$_2$O$_3$: 14.6
SiO$_2$: 35.4
MgO: 5.8
TiO$_2$: 0.6
Fe$_2$O$_3$: 0.6
MnO: 0.7
S: 0.83
Ignition Loss: 0.6

This slag was pulverized and particles having a size smaller than 10$\mu$ were collected to obtain finely divided calcium aluminosilicate (sample AC-4).

In the same manner as described in Example 1, $\alpha$-gypsum hemihydrate, finely divided calcium silicate or calcium aluminosilicate and water were mixed at a mixing ratio indicated in Table 3 and kneaded to form a paste. The paste was cast in a groud-shaped mold of an inner volume of 70 cc for a Michaelis strength tester and in an angular columnar mold having a size of 20 mm × 20 mm × 80 mm, and shaped structures were allowed to stand and aged at a temperature of 25° ± 5° C. and a relative humidity of about 50% for 5 days, to thereby form groud-shaped and angular columnar hardened structures of gypsum. Each hardened shaped structure was dipped in a saturated aqueous solution of oxalic acid (having a concentration of 10% by weight) at a temperature of 15° ± 5° C. for 30 minutes, and the impregnated structure was allowed to stand still in open air and dried. Thus, 25 kinds of water-resistant hardened shaped structures (samples A-1 to A-25) were prepared.

In the same manner as described in Example, the filled Ca amount (C$_1$) and insoluble Ca amount (C$_2$) were determined with respect to each sample. Further, the volume of pores having a radius of 75 to 75000 Å in the surface portion of each sample was determined by a mercury porosimeter, and the ratio of reduction of the volume in running water was determined to evaluate the water resistance. Still further, water absorptions in the state dipped in water and at a relative humidity of 100% were determined, and the bending strength after absorption of water was determined. Results of these tests are shown in Table 3.

Table 3

| Sample | A-1 | A-2 | A-3 | A-4 | A-5 | A-6 | A-7 | A-8 | A-9 | A-10 |
|---|---|---|---|---|---|---|---|---|---|---|
| Filler Reactant Sample | CS-1 | CS-1 | CS-2 | CS-2 | CS-2 | CS-2 | CS-2 | CS-3 | CS-3 | CS-4 |
| Amounts (g) | | | | | | | | | | |
| gypsum hemihydrate | 80 | 80 | 90 | 80 | 75 | 65 | 55 | 80 | 80 | 80 |
| filler reactant | 20 | 20 | 10 | 20 | 25 | 35 | 45 | 20 | 20 | 20 |
| water | 60 | 80 | 60 | 60 | 60 | 60 | 60 | 60 | 80 | 60 |
| Filled Ca Amount (C$_1$)(%) | 23.8 | 23.8 | 15.8 | 29.6 | 36.0 | 47.6 | 58.0 | 29.0 | 29.0 | 28.3 |
| Insoluble Ca Amount (C$_2$)(%) | 2.7 | 2.8 | 2.6 | 2.5 | 2.4 | 2.3 | 2.2 | 2.6 | 2.7 | 2.6 |
| Pore Volume (ml/g) | | | | | | | | | | |
| 75 Å – 75000 Å | 0.338 | 0.484 | 0.485 | 0.340 | 0.333 | 0.320 | 0.300 | 0.335 | 0.480 | 0.340 |
| 4000 Å – 10000 Å | 0.115 | 0.172 | 0.195 | 0.143 | 0.122 | 0.110 | 0.104 | 0.148 | 0.175 | 0.150 |

Table 3-continued

| | | | | | | | | | | |
|---|---|---|---|---|---|---|---|---|---|---|
| Ratio (%) of Volume Reduction in Running Water | 0 | 0 | 0 | 0 | 0 | 0 | 0 | 0 | 0 | 0 |
| Water Absorption | | | | | | | | | | |
| *dipped in water* | | | | | | | | | | |
| 0.5 minute | 4 | 7 | 10 | 4 | 3 | 3 | 3 | 4 | 7 | 4 |
| 1 minute | 7 | 14 | 17 | 7 | 6 | 6 | 6 | 7 | 14 | 7 |
| 3 minutes | 16 | 22 | 23 | 16 | 15 | 15 | 15 | 16 | 22 | 16 |
| 60 minutes | 20 | 23 | 24 | 20 | 20 | 20 | 20 | 20 | 23 | 20 |
| Sample | A-11 | A-12 | A-13 | A-14 | A-15 | A-16 | A-17 | A-18 | A-19 | A-20 |
| Filler Reactant Sample | CS-4 | AC-1 | AC-1 | AC-1 | AC-1 | AC-2 | AC-2 | AC-2 | AC-3 | AC-3 |
| Amounts (g) | | | | | | | | | | |
| gypsum hemihydrate | 80 | 80 | 75 | 75 | 60 | 90 | 75 | 60 | 86 | 75 |
| filler reactant | 20 | 20 | 25 | 25 | 40 | 10 | 25 | 40 | 14 | 25 |
| water | 80 | 60 | 60 | 80 | 60 | 60 | 60 | 60 | 60 | 60 |
| Filled Ca Amount $(C_1)$(%) | 28.3 | 28.2 | 34.3 | 34.5 | 51.2 | 20.6 | 43.8 | 61.0 | 18.7 | 32.0 |
| Insoluble Ca Amount $(C_2)$(%) | 2.7 | 2.5 | 2.5 | 2.6 | 2.3 | 2.1 | 2.1 | 1.8 | 2.7 | 2.6 |
| Pore Volume (ml/g) | | | | | | | | | | |
| 75 A – 75000 A | 0.485 | 0.330 | 0.325 | 0.435 | 0.320 | 0.370 | 0.342 | 0.305 | 0.420 | 0.375 |
| 4000 A – 10000 A | 0.184 | 0.122 | 0.118 | 0.174 | 0.113 | 0.185 | 0.158 | 0.114 | 0.195 | 0.160 |
| Ratio (%) of Volume Reduction in Running Water | 0 | 0 | 0 | 0 | 0 | 2 | 0 | 0 | 4 | 0 |
| Water Absorption | | | | | | | | | | |
| *dipped in water* | | | | | | | | | | |
| 0.5 minute | 7 | 4 | 3 | 7 | 4 | 10 | 3 | 4 | 9 | 4 |
| 1 minute | 4 | 7 | 6 | 14 | 7 | 17 | 6 | 7 | 16 | 8 |
| 3 minutes | 22 | 16 | 15 | 22 | 16 | 23 | 15 | 17 | 22 | 16 |
| 60 minutes | 23 | 20 | 20 | 23 | 21 | 24 | 20 | 22 | 23 | 21 |
| Sample | A-21 | A-22 | A-23 | A-24 | A-25 | | | | | |
| Filler Reactant Sample | AC-3 | AC-4 | AC-4 | AC-4 | AC-4 | | | | | |
| Amounts (g) | | | | | | | | | | |
| gypsum hemihydrate | 60 | 80 | 75 | 75 | 60 | | | | | |
| filler reactant | 40 | 20 | 25 | 25 | 40 | | | | | |
| water | 60 | 60 | 60 | 80 | 60 | | | | | |
| Filled Ca Amount $(C_1)$(%) | 48.5 | 27.0 | 33.1 | 33.0 | 49.7 | | | | | |
| Insoluble Ca Amount $(C_2)$(%) | 2.4 | 2.6 | 2.5 | 2.6 | 2.4 | | | | | |
| Pore Volume (ml/g) | | | | | | | | | | |
| 75 A – 75000 A | 0.336 | 0.382 | 0.343 | 0.457 | 0.320 | | | | | |
| 4000 A – 10000 A | 0.147 | 0.182 | 0.159 | 0.180 | 0.121 | | | | | |
| Ratio (%) of Volume Reduction in Running Water | 0 | 0 | 0 | 0 | 0 | | | | | |
| Water Absorption | | | | | | | | | | |
| *dipped in water* | | | | | | | | | | |
| 0.5 minute | 5 | 4 | 3 | 7 | 4 | | | | | |
| 1 minute | 8 | 7 | 6 | 14 | 7 | | | | | |
| 3 minutes | 17 | 16 | 15 | 22 | 16 | | | | | |
| 60 minutes | 22 | 20 | 20 | 23 | 21 | | | | | |
| Sample | A-1 | A-2 | A-3 | A-4 | A-5 | A-6 | A-7 | A-8 | A-9 | A-10 |
| Water Absorption | | | | | | | | | | |
| *at 100% relative humidity* | | | | | | | | | | |
| 1 day | 0.1 | 0.3 | 0.6 | 0.1 | 0.1 | 0.1 | 0.1 | 0.1 | 0.3 | 0.1 |
| 3 days | 0.4 | 0.7 | 1.0 | 0.4 | 0.4 | 0.3 | 0.3 | 0.4 | 0.7 | 0.4 |
| 5 days | 0.7 | 1.0 | 1.3 | 0.7 | 0.6 | 0.5 | 0.5 | 0.7 | 1.0 | 0.7 |
| 9 days | 0.8 | 1.1 | 1.4 | 0.8 | 0.7 | 0.6 | 0.6 | 0.8 | 1.1 | 0.8 |
| Bending Strength (Kg/cm²)* | | | | | | | | | | |
| before absorption of water | 53 | 53 | 55 | 53 | 53 | 52 | 51 | 53 | 53 | 53 |
| *dipped in water* | | | | | | | | | | |
| 0.5 minute | 48 (90.6) | 37 (69.8) | 52 (94.5) | 48 (90.6) | 48 (90.6) | 37 (71.2) | 33 (64.7) | 48 (90.6) | 36 (67.9) | 48 (90.6) |
| 60 minutes | 38 (71.7) | 34 (64.2) | 42 (76.4) | 38 (71.7) | 38 (71.7) | 33 (63.5) | 32 (62.7) | 38 (71.7) | 35 (66.0) | 38 (71.7) |
| *at 100% relative humidity* | | | | | | | | | | |
| 3 days | 41 (77.4) | 41 (77.4) | 44 (80.0) | 41 (77.4) | 41 (77.4) | 40 (76.9) | 37 (72.5) | 41 (77.4) | 41 (77.4) | 41 (77.4) |
| 9 days | 39 (73.6) | 40 (75.5) | 42 (76.4) | 39 (73.6) | 39 (73.6) | 39 (75.0) | 35 (68.6) | 39 (73.6) | 40 (75.5) | 39 (73.6) |
| Sample | A-11 | A-12 | A-13 | A-14 | A-15 | A-16 | A-17 | A-18 | A-19 | A-20 |
| Water Absorption | | | | | | | | | | |
| *at 100% relative humidity* | | | | | | | | | | |
| 1 day | 0.3 | 0.1 | 0.1 | 0.3 | 0.2 | 0.6 | 0.1 | 0.2 | 0.5 | 0.2 |
| 3 days | 0.7 | 0.4 | 0.4 | 0.7 | 0.5 | 1.0 | 0.4 | 0.5 | 0.9 | 0.5 |
| 5 days | 1.0 | 0.7 | 0.6 | 1.0 | 0.8 | 1.3 | 0.6 | 0.9 | 1.2 | 0.8 |
| 9 days | 1.1 | 0.8 | 0.7 | 1.1 | 0.9 | 1.4 | 0.8 | 1.0 | 1.3 | 0.9 |
| Bending Strength (Kg/cm²)* | | | | | | | | | | |
| before absorption of water | 53 | 52 | 52 | 52 | 51 | 54 | 52 | 51 | 53 | 52 |
| *dipped in water* | | | | | | | | | | |
| 0.5 minute | 36 (67.9) | 47 (90.4) | 47 (90.4) | 37 (71.2) | 34 (66.7) | 51 (94.4) | 47 (90.4) | 34 (66.7) | 51 (96.2) | 47 (90.4) |
| 60 minutes | 35 (66.0) | 37 (71.2) | 37 (71.2) | 34 (65.4) | 32 (62.7) | 41 (75.9) | 37 (71.2) | 32 (62.7) | 41 (77.4) | 37 (71.2) |
| *at 100% relative humidity* | | | | | | | | | | |
| 3 days | 41 (77.4) | 41 (78.8) | 41 (78.8) | 40 (76.9) | 39 (76.5) | 44 (81.5) | 40 (76.9) | 39 (76.5) | 43 (81.1) | 41 (78.8) |

Table 3-continued

| | | | | | | | | | | |
|---|---|---|---|---|---|---|---|---|---|---|
| 9 days | 39 (75.5) | 39 (75.0) | 39 (75.0) | 38 (73.1) | 38 (74.5) | 42 (82.4) | 39 (75.0) | 38 (74.5) | 42 (79.2) | 39 (75.0) |
| Sample | A-21 | A-22 | A-23 | A-24 | A-25 | | | | | |
| Water Absorption | | | | | | | | | | |
| at 100% relative humidity | | | | | | | | | | |
| 1 day | 0.3 | 0.1 | 0.1 | 0.3 | 0.2 | | | | | |
| 3 days | 0.6 | 0.4 | 0.4 | 0.7 | 0.5 | | | | | |
| 5 days | 0.8 | 0.7 | 0.6 | 1.0 | 0.8 | | | | | |
| 9 days | 0.9 | 0.8 | 0.7 | 1.1 | 0.9 | | | | | |
| Bending Strength (Kg/cm$^2$)* | | | | | | | | | | |
| before absorption of water | 51 | 52 | 52 | 52 | 51 | | | | | |
| dipped in water | | | | | | | | | | |
| 0.5 minute | 34 (66.7) | 47 (90.4) | 47 (90.4) | 37 (71.2) | 34 (66.7) | | | | | |
| 60 minutes | 32 (62.7) | 37 (71.2) | 37 (71.2) | 34 (65.4) | 32 (62.7) | | | | | |
| at 100% relative humidity | | | | | | | | | | |
| 3 days | 39 (76.5) | 41 (78.8) | 41 (78.8) | 40 (76.9) | 39 (76.5) | | | | | |
| 9 days | 38 (74.5) | 39 (75.0) | 39 (75.0) | 38 (73.1) | 38 (74.5) | | | | | |

*each parenthesized value indicates the strength retention ratio.

From the results shown in Table 3, it will readily be understood that when calcium silicate or calcium aluminosilicate is used as the calcium type filler reactant and the shaped structure of gypsum is treated with a polybasic acid such as oxalic acid, a very high water resistance is effectively imparted to the hardened shaped structure of gypsum.

EXAMPLE 3

This Example illustrates production of a hardened shaped structure having a high water resistance and an improved bending strength.

In the same manner as described in Example 1, 20 g of calcium oxide was added to 80 g of α-type gypsum hemihydrated and 75 ml of water was further added to the mixture to form a slurry. Then, 4 g of commercially available acrylamide of the reagent grade, 0.22 g of ammonium persulfate [$(NH_4)_2S_2O_8$] and 0.2 g of sodium sulfite ($Na_2SO_3 \cdot 7H_2O$) were added to the slurry and the mixture was intimately blended to form a homogeneous paste. From this slurry, a hardened shaped structure of gypsum was prepared and treated with oxalic acid in the same manner as described in Example 1. Then, physical properties of the product were tested in the same manner as described in Example 1 to obtain the following results:

Filled Ca amount ($C_1$): 33.0%
Insoluble Ca amount ($C_2$): 2.6%
Pore volume (75–75000 Å): 0.490 ml/g
Pore volume (4000–10000 Å): 0.128 ml/g
Ratio of volume reduction in running water: 0%
Water absorption in the state dipped in water: 60 minutes: 20%
Water absorption at 100% relative humidity: 9 days: 0.7%
Bending strength:
  before absorption of water: 154 Kg/cm$^2$
  after 60 minutes' dipping in water: 127 Kg/cm$^2$
  strength retention ratio: 83%
  after 9 days' standing at 100% relative humidity: 130 Kg/cm$^2$
  strength retention ratio: 85%

From the foregoing results, it will readily be understood that when acrylamide is incorporated into a water-hardening composition comprising gypsum hemihydrate and a filler reactant such as calcium hydroxide, acrylamide is polymerized simultaneously with hardening of the gypsum composition and the hardened structure is treated with a polybasic acid such as oxalic acid, the bending strength (154 Kg/cm$^2$) of the resulting hardened shaped structure is much improved over the bending strength (53 Kg/cm$^2$) of the hardened shaped structure formed without incorporation of acrylamide (sample 1 in Example 1), while retaining the water resistance at a similar high level.

What we claim is:

1. A water-resistant shaped structure of gypsum comprising (A) calcium sulfate dihydrate formed by hardening of calcium sulfate capable of hydration reaction, (B) a calcium type filler for filling up spaces among crystalline particles of said calcium sulfate dihydrate and (C) a water-insoluble or hardly water-soluble calcium salt of a polybasic acid having a second stage dissociation constant of $10^{-3}$ to $10^{-10}$, as measured at 25° C., said calcium type filler (B) being at least one calcium compound selected from the group consisting of calcium hydroxide, calcium carbonate, calcium silicate, calcium aluminosilicate, and non-water hardenable anhydrous gypsum and partially hydrated products thereof, wherein the amount of the calcium type filler (B) and the water-insoluble or hardly water-soluble calcium salt (C) is 15 to 75% based on the total amount of the components (A), (B) and (C) as calculated as calcium, the amount of the water-insoluble or hardly water-soluble calcium salt (C) is 1 to 30% based on the total amount of the components (A), (B) and (C) as calculated as calcium, the water-insoluble or hardly water-soluble calcium salt (C) is distributed predominantly in the surface portion of the shaped structure and is formed in situ in said shaped structure by reaction of said calcium type filler (B) with said polybasic acid or a water-soluble salt thereof, and said surface portion has a pore volume smaller than 0.50 ml/g in pores having a radius in the range of 75 to 75000 Å and a pore volume smaller than 0.20 ml/g in pores having a radius in the range of 4000 to 10000 Å.

2. A shaped structure as set forth in claim 1 wherein in the surface portion of the shaped structure of gypsum, the mode radius of pores is not larger than 0.5μ.

3. A shaped structure as set forth in claim 1 wherein the polybasic acid is oxalic acid, phosphoric acid or hexafluorosilicic acid.

4. A shaped structure as set forth in claim 1 wherein the shaped structure of gypsum further comprise a polymer of a water-soluble ethylenically unsaturated monomer formed by polymerization in situ in an amount of 0.05 to 15% by weight based on the component (A).

5. A shaped structure as set forth in claim 4 wherein the water-soluble ethylenically unsaturated monomer is an ethylenically unsaturated carboxylic acid or an amide thereof.

6. A shaped structure as set forth in claim 5 wherein the water-soluble ethylenically unsaturated monomer is acrylamide.

7. A process for the production of water-resistant hardened shaped structures of gypsum comprising hardening a shaped structure comprising (A') calcium sulfate capable of hydration reaction, (B') a calcium type filler reactant in an amount of 17 to 300% based on said calcium sulfate (A') as calculated as calcium and (D) water in an amount sufficient to harden said calcium sulfate, the calcium type filler reactant (B') being calcium hydroxide, calcium carbonate, calcium silicate, calcium aluminosilicate, non-water-hardenable anhydrous gypsum or a mixture of calcium carbonate, calcium silicate, calcium aluminosilicate or non-water-hardenable anhydrous gypsum with calcium hydroxide, contacting the hardened shaped structure with an aqueous solution of a water-soluble polybasic acid or water-soluble salt thereof having a second stage dissociation constant of $10^{-3}$ to $10^{-10}$ as measured at 25° C. and thereby converting the calcium type filler reactant (B') so that (C) a water-insoluble or hardly water-soluble salt of said polybasic acid is formed in an amount of 0.1 to 30% based on the total components as calculated as calcium.

8. A process for the production of hardened shaped structures of gypsum according to claim 7 wherein said shaped structure further comprises a water-soluble ethylenically unsaturated monomer in an amount of 0.05 to 15% by weight based on the calcium sulfate (A') as calculated as the dihydrate with a catalytic amount of a polymerization initiator in the form of a solution, and said water-soluble ethylenically unsaturated monomer is polymerized while the shaped structure is being hardened.

9. A process for the preparation of hardened shaped structures of gypsum according to claim 7 wherein the surface portion of the hardened shaped structure is impregnated with the aqueous solution of a water-soluble polybasic acid or water-soluble salt thereof, the calcium type filler reactant (B') in the surface portion is converted to a water-insoluble or hardly water-soluble calcium salt of said polybasic acid so that the treated surface portion has a pore volume smaller than 0.50 ml/g in pores having a radius in the range of 75 to 75000 Å and a pore volume smaller than 0.20 ml/g in pores having a radius in the range of 4000 to 10000 Å.

10. A process according to claim 7 wherein in the treated surface portion of the shaped structure, the mode radius of pores is not larger than $0.5\mu$.

11. A process according to claim 7 wherein the polybasic acid is oxalic acid, phosphoric acid or hexafluorosilicic acid.

12. A shaped structure as set forth in claim 1 wherein the polybasic acid has a second stage dissociation constant of $10^{-4}$ to $10^{-9}$.

13. A process for the production of hardened shaped structures of gypsum according to claim 7 wherein the step of hardening the shaped structure is carried out in a carbon dioxide gas atmosphere.

14. A process for the production of hardened shaped structures of gypsum according to claim 7 wherein the calcium type filler reactant (B') has a particle size distribution in which particles having a particle size larger than 40 microns occupy less than 10% of the total particles and particles having a particle size smaller than 20 microns occupy at least 50% of the total particles, said calcium type filler reactant having a specific surface area in the range of 10 to 400 m²/g.

15. A process for the production of hardened shaped structures of gypsum according to claim 14 wherein the amount of the calcium type filler reactant is from 25% to 150% based on calcium sulfate (A').

16. A process for the production of hardened shaped structures of gypsum according to claim 7 wherein the amount of water (D) added to harden said calcium sulfate (A') is from 0.3 to 1.5 parts by weight, per part by weight of the sum of the components (A') and (B').

* * * * *